United States Patent [19]

Gheorghiu et al.

[11] Patent Number: 5,634,035

[45] Date of Patent: May 27, 1997

[54] HDLC HARDWARE ENGINE AND SHARED MEMORY INTERFACE WITH ACCESS REQUEST/ACKNOWLEDGEMENT CONTROL AND ADDRESSING SCHEME

[75] Inventors: Florin Gheorghiu, San Jose; Catherine Nguyen, Milpitas, both of Calif.

[73] Assignee: Siemens Business Communication Systems, Inc., Santa Clara, Calif.

[21] Appl. No.: 528,754

[22] Filed: Sep. 15, 1995

Related U.S. Application Data

[63] Continuation of Ser. No. 991,699, Dec. 16, 1992, abandoned.

[51] Int. Cl.⁶ .............................. G06F 12/00; G06F 13/00
[52] U.S. Cl. .......................... 395/474; 395/309; 395/824; 395/401; 395/866
[58] Field of Search ........................ 395/309, 474, 395/431, 823, 824, 829, 850, 866, 401

[56] References Cited

U.S. PATENT DOCUMENTS

| | | | |
|---|---|---|---|
| 3,631,405 | 12/1971 | Hoff et al. | 395/650 |
| 3,778,780 | 12/1973 | Moore | 395/650 |
| 4,096,572 | 6/1978 | Namimoto | 395/425 |
| 4,539,655 | 9/1985 | Trussell et al. | 395/325 |
| 4,542,498 | 9/1985 | Bodros et al. | 370/60 |
| 4,622,630 | 11/1986 | Vora et al. | 364/134 |
| 4,674,033 | 6/1987 | Miller | 395/425 |
| 4,870,704 | 9/1989 | Matelan et al. | 395/800 |
| 4,894,822 | 1/1990 | Buhrke et al. | 370/60 |
| 5,142,683 | 8/1992 | Burkhardt, Jr. et al. | 395/725 |
| 5,283,869 | 2/1994 | Adams et al. | 395/200.2 |

*Primary Examiner*—Matthew M. Kim

[57] ABSTRACT

By handling initial processing of HDLC frames, an HDLC engine can free up a server microprocessor that would otherwise be tasked to respond to incoming frames. Sharing a memory with the microprocessor, the engine periodically accesses an address status table in the memory to retrieve data in order to process received frames based on the status of the frame address.

15 Claims, 4 Drawing Sheets

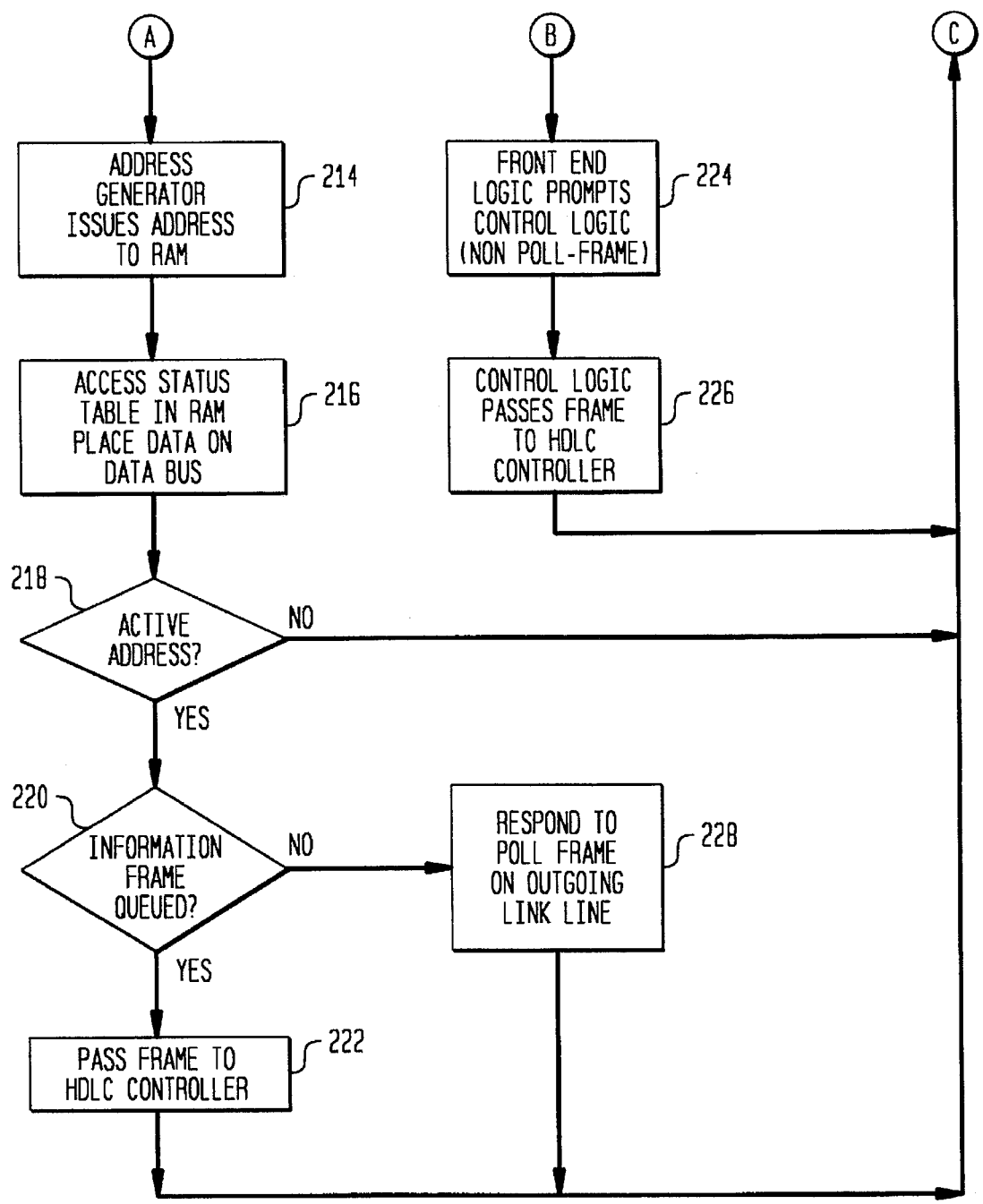

HDLC HARDWARE ENGINE AND SHARED MEMORY INTERFACE WITH ACCESS REQUEST/ACKNOWLEDGEMENT CONTROL AND ADDRESSING SCHEME

CROSS-REFERENCE TO RELATED APPLICATION

This is a continuation of Ser. No. 07/991,669 filed Dec. 16, 1992, now abandoned.

FIELD OF THE INVENTION

This invention generally relates to the HDLC (high level data link control communications protocol. Specifically, the invention is directed to an apparatus that will parse, interpret, and respond to messages transmitted in the HDLC format.

BACKGROUND OF THE INVENTION

The HDLC (high level data link control) protocol, established by international convention (ISO 3309), supports multiple sessions or addresses on a single link. In data transmission systems, such as a telephone switching system, HDLC frames are specified for a given address and must be processed based on the status of that address, independently of the status of other addresses.

The function of an HDLC engine is to emulate the behavior of multiple independent HDLC transmitters and receivers. In one hypothetical arrangement, there are twenty-five individual addresses and a broadcast address. The system keeps track of these individual addresses by way of a status table stored in the system's memory. The engine analyzes incoming HDLC frames and takes appropriate action, the actual response of the engine depends on the status of the address and the incoming frame type. In the systems under discussion, the engine would either discard the frame, generate the proper response, or pass the frame to the microprocessor or a dedicated HDLC controller.

To achieve the necessary performance, one could provide a separate HDLC engine for each address and each such engine would have an internal address status register. While this would eliminate the need for a dedicated memory holding the status of each address, the overall cost of the system would increase greatly due to the use of separate engines and the circuit board real estate required to accommodate these components.

Another method of handling the HDLC messages uses a single engine that passes the address of each frame to a microprocessor through a polling or interrupt process. The processor would use the address to access the status table in memory and notify the engine of the result so that the engine could take the appropriate action. Although it would simplify hardware requirements, this arrangement would tie up the microprocessor, preventing the microprocessor from tending to other tasks, and its ability to process incoming messages would be dependent on the microprocessor's speed.

A third solution would be to store an address status table in a dual-port RAM (random access memory) with processor access on one port and engine access on the other port. Although this scheme would eliminate the bottleneck caused by having to pass everything through the processor and would also improve the speed of the system, dual-port RAMs are expensive and would require additional board space.

The ideal solution therefore would minimize the use of the microprocessor and component count, without sacrificing efficiency.

SUMMARY OF THE INVENTION

These and other objects are achieved by an HDLC engine accessing a single-port memory shared with a microprocessor. By sending a bus request signal to the microprocessor, the HDLC engine can periodically access an address status table stored in the memory. The status data would be passed back to the engine for analysis and response. The scheme thus relieves the microprocessor from the task of analysis of HDLC frames.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein:

FIG. 2A and 2B are a flow chart of the operation of the HDLC server circuit.

DETAILED DESCRIPTION OF THE INVENTION

Figure 1A:
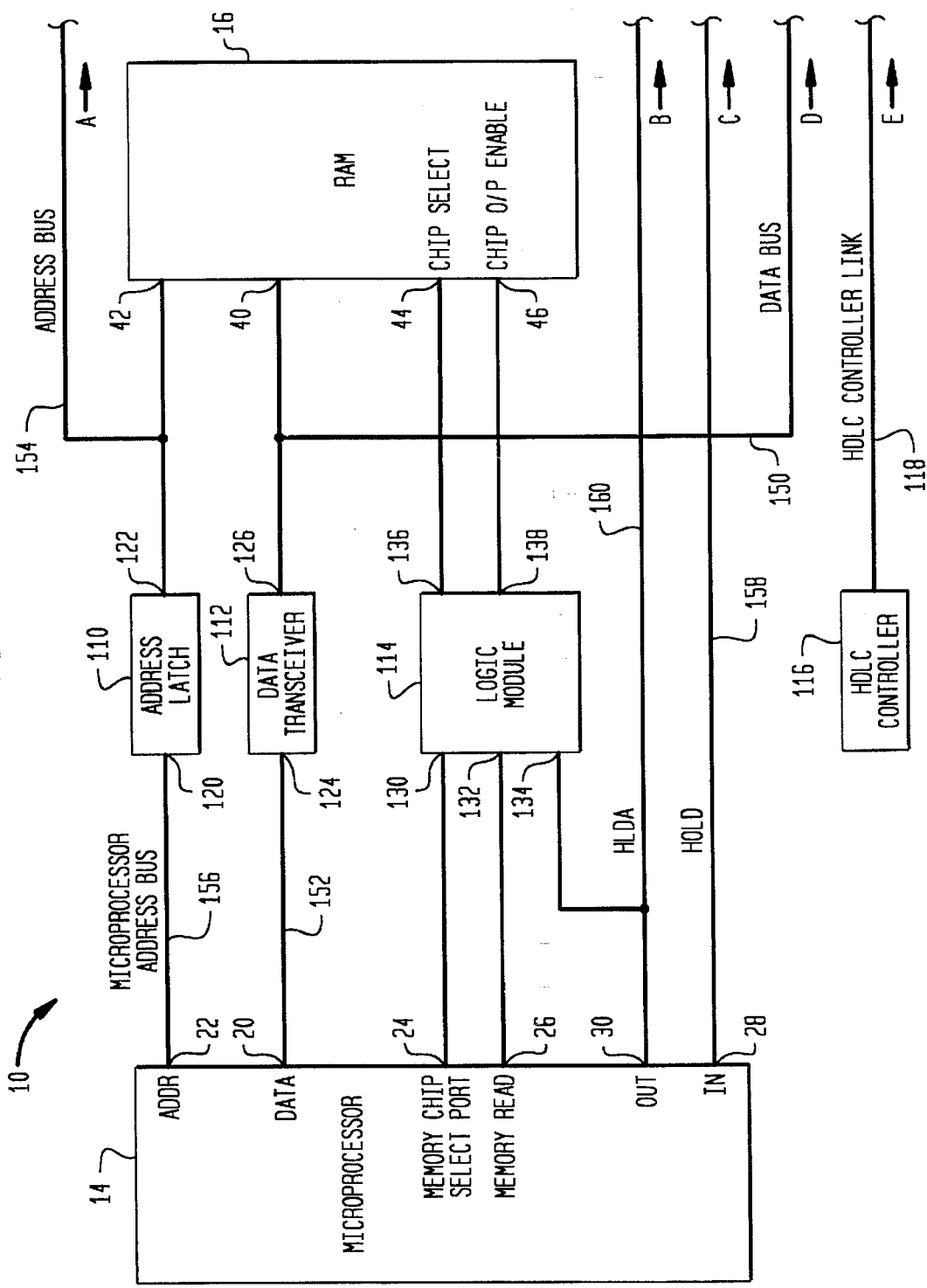
FIG. 1A and 1B are a schematic block diagram of an HDLC server circuit containing the HDLC engine, a microprocessor, and associated components.
Figure 1B:
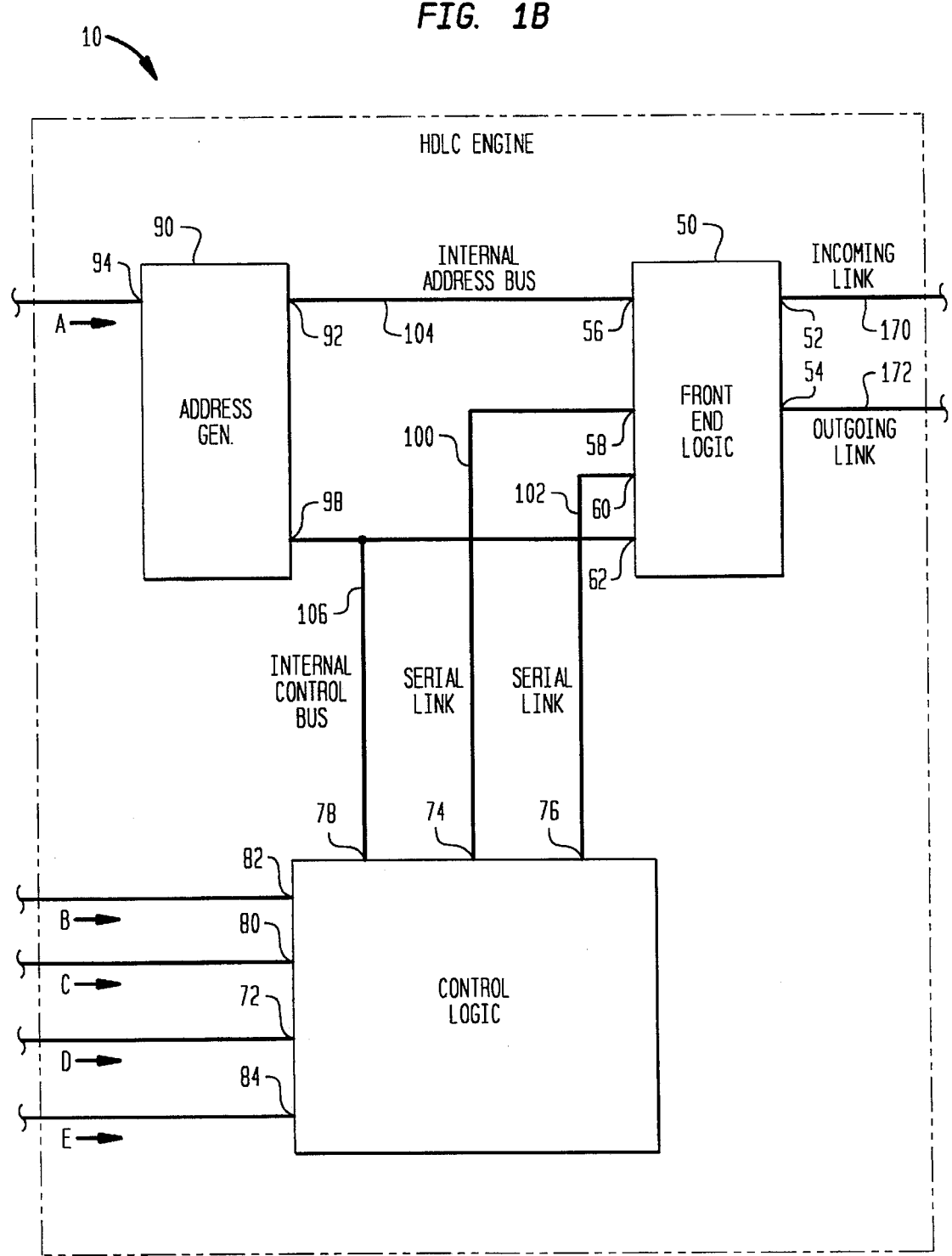

An HDLC server 10 is shown partially in the block schematic diagram of FIGS. 1A and 1B. The purpose of the server 10 is to handle functions relating to the HDLC protocol. The server 10 has an HDLC engine 12, a microprocessor 14, and a RAM 16. The server may also include a dedicated HDLC controller, as discussed further on.

The HDLC engine 12 has three subsystems: front end logic 50, control logic 70, and an address generator 90. The engine 12 handles the initial analysis and screening of HDLC frames, offloading these functions from the microprocessor 14. The microprocessor 14 is a general purpose device and has six ports: a data port 20, an address port 22, a memory chip select port 24, a memory read port 26, a HOLD input port 28, and an HLDA (HOLD acknowledge) output port 30. The RAM 16 has four ports: a data port 40, an address port 42, a chip select port 44, and a chip output enable port 46. The RAM 16 contains a status table used by the HDLC engine 12 and the microprocessor 14.

The front end logic 50 receives HDLC frames and checks for a valid address and the frame type. It has six ports: a serial HDLC input port 52, a serial HDLC output port 54, an address output port 56, an internal serial output port 58, an internal serial input port 60, and an internal control bus port 62. The serial HDLC input port 52 is connected to a serial HDLC incoming link HIL 170 while the serial HDLC output port 54 is connected to a serial HDLC outgoing link HOL 172. The two links 170 and 172 provide the connection between the HDLC engine 12 and the larger system in which the engine 12 and the server 10 reside.

The control logic 70 controls the operation of the HDLC engine 12. It has seven ports: a data bus port 72, an internal serial input port 74, an internal serial output port 76, an internal control bus port 78, a HOLD request port 80, an HLDA port 82, and an HDLC controller port 84. The HOLD request port 80 is connected to the HOLD input port 28 of the microprocessor 14 by a HOLD enable line 158.

The address generator 90 generates a RAM address to access the status table stored in the RAM 16. The address generator 90 has three ports: an address input port 92, an address output port 94, and an internal control bus port 98.

The front end logic 50, the control logic 70, and the address generator 90 are connected within the HDLC engine 12 in the following manner. One serial link 100 connects the internal serial output 58 of the front end logic 50 to the internal serial input 74 of the control logic 70. Another serial link 102 connects the internal serial output 76 of the control logic 70 to the internal serial input 60 of the front end logic 50. An internal address bus 104 interconnects the address output port 56 of the front end logic 50 with the address input port 92 of the address generator 90. An internal control bus 106 interconnects the internal control bus port 62 of the front end logic 50, the internal control bus port 78 of the control logic 70, and the internal control bus port 98 of the address generator 90.

There are four other components illustrated in the server 10: an address latch 110, a data transceiver 112, a logic module 114, and an HDLC controller 116. The address latch 110 has two address ports 120 and 122, one (122) being connected by an address bus 154 to the address port 94 of the address generator 90 in the HDLC engine 12 and to the address port 42 of the RAM 16, and the other (120) being connected by a microprocessor address bus 156 to the address port 22 of the microprocessor 14.

The latch 110 holds address information issued by the microprocessor 14 for accessing the RAM 16. The data transceiver 112 also has two ports 124 and 126, one (126) being connected by a data bus 150 to the data port 40 of the RAM 16 and to the data port 72 of the control logic 70 in the HDLC engine 12, and the other (124) being connected by a microprocessor data bus 152 to the data port 20 of the microprocessor 14. The data transceiver 112 acts as a conduit for data going to and from the RAM 16.

The logic module 114 has five ports: a chip select input 130 and a memory read input 132, connected to the memory chip select output 24 and the memory read output 26 of the microprocessor 14, respectively, an HLDA input 134, connected by an HLDA line 160 to the HLDA output 30 of the microprocessor 14 and the HLDA input 82 of the control logic 70 in the HDLC server 12, a chip select output 136 connected to the chip select input 44 of the RAM 16, and a chip enable output 138 connected to the chip output enable port 46 of the RAM 16. This module allows the HDLC engine 12 to access the address status table stored in the RAM 16, as well as permitting the microprocessor 14 access to the RAM 16. The chip select output 136 is the logical-OR of the chip select input 130 and the HLDA input 134; the chip enable output 138 is the logical-OR of the memory read input 132 and the HLDA input 134.

The HDLC controller 116 is connected to the HDLC engine 12 by an HDLC controller link 118. The link 118 is connected within the engine 12 to the HDLC controller port 84 of the control logic 70. The engine 12 uses the link 118 to pass selected incoming HDLC frames to the controller 116 for further processing by the controller 116 and the microprocessor 14.

The HDLC engine 12 can be implemented in a field programmable gate array ("FPGA"), which is configured by the user to provide the logic functions desired. In the embodiment under discussion, Xilinx 3000 FPGAs, available from Xilinx, 2100 Logic Drive, San Jose, Calif., were used. These components, as well as the methods for configuring and programming them, are described in detail in the 1992 Xilinx Programmable Gate Array Databook. Of course, one could use dedicated logic chips or other suitable devices. The HDLC controller can be a Siemens SAB 82525.

OPERATION OF THE HDLC ENGINE

Figure 2A:
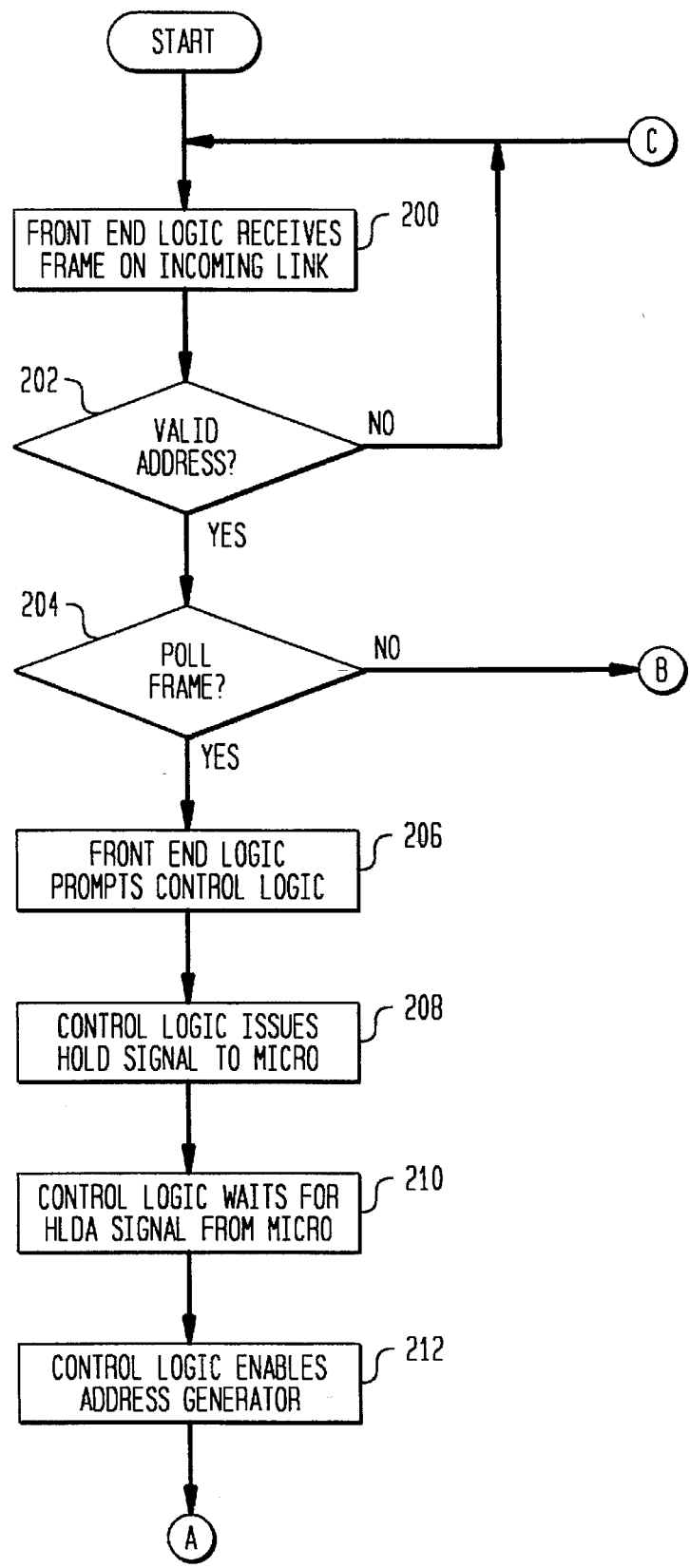

The operation of the device will be explained with reference to the flow chart in FIGS. 2A and 2B. The numbers in parentheses refer to the blocks of the chart.

At the outset, the front end logic 50 receives an HDLC frame over the serial HDLC incoming link HIL 170 (200). The frame, adhering to the standard in ISO 3309, has an address field and a designation in the control field indicating the type of frame.

The front end logic 50 will first check to see if the address is valid (202). The list of valid addresses is fixed and resident as a hard-wired function in the front end logic 50. If the address is not valid, the frame is discarded and the front end logic 50 will wait for another frame on the incoming link HIL 170 (200).

Assuming a valid address, the front end logic 50 will then examine the frame control field, which follows the flag and address fields, to determine whether the designator for a poll frame is present. If not, the front end logic 50 prompts the control logic 70 to indicate that the received frame is not a poll frame (224). The control logic 70 will then pass the received frame to the HDLC controller 116 for processing (226). The front end logic 50 thereafter resumes its wait for another frame on the incoming link HIL 170 (200).

However, if the frame is a poll frame, the front end logic 50 will send a prompt on internal control bus 106 to the control logic 70 (206) requesting that stage to issue a HOLD command on HOLD request line 158 to the microprocessor 14 (208). The control logic 70 will wait until the microprocessor 14 finishes its current operation, at which time the microprocessor 14 will acknowledge the HOLD command by issuing a hold acknowledge HLDA signal on HLDA line 160 for reception by the control logic 70 (210). Upon receiving the HLDA signal, the control logic 70 will enable the address generator 90 using the internal control bus 106 (212). The address generator 90 will have received the proper HDLC address for the frame from the front end logic 50 on the engine's internal address bus 104 and from that will have generated the actual RAM address.

When the microprocessor 14 issued the HLDA signal on line 160, the signal was also coupled to the logic module 114, enabling the chip select and chip output enable ports 44 and 46 of the RAM 16. Acting on the enabling signal received from the control logic 70 on the internal control bus 106, the address generator 90 issues the address location on the address bus 154 for the frame status in the RAM 16 (214). The status of the polled address will now be placed on the data bus 150 for the control logic 70 (216).

The control logic 70 will now analyze the status data. First, it checks to see if the address is active (218). In the context of a telephone switch, this could mean whether a subscriber equipment line card is present and in service. If the address is inactive, the HDLC engine 12 will discard the incoming frame without issuing any response on the serial HDLC outgoing link HOL 172, returning to the start to await the next frame.

If the address is active, then the engine 12 will act based on whether an information frame, essentially a message, is queued for this address (220). If an information frame is queued, the control logic 70 will pass the poll frame out of the engine on the HDLC controller link 118 to the HDLC controller 116 (222). However, if no information frames are queued, then the control logic 70 will direct the front end logic 50 to respond to the poll frame on the serial HDLC outgoing link HOL 172 (228). After this, the HDLC engine 12 resumes waiting for another frame (200). p While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, although the discussion focused on HDLC, it should be recognized that the invention may be used with data in other formats.

What is claimed is:

1. In a data transmission system an apparatus for screening and analysis of a plurality of frames of a high level data link control (HDLC) protocol including an addressable random access memory (RAM) shared between a microprocessor and an HDLC controller, said apparatus comprising:

front end logic means, including an input port and an output port, for receiving said plurality of HDLC frames and verifying various data present in each of said plurality of frames, said data corresponding to predefined addresses and one of a plurality of frame types, with said front end logic means discarding HDLC frames having addresses differing from said predefined addresses, said plurality of frame types including poll frames, having polling data, and frames not including polling data, defining non-poll frames;

control logic means, coupled to both said front end logic and said RAM, for transmitting a bus request to said microprocessor upon sensing notification from said front end logic means of receipt of a poll frame and transmitting said non-poll frames directly to said HDLC controller;

a logic module coupled between said microprocessor and said RAM, with the logic module being operable to enable the control logic to retrieve data corresponding to a predefined address in the RAM, upon receipt of a hold acknowledge signal from said microprocessor; and address generator means, coupled to said RAM, said control logic means and said front end logic means, for generating, in response to both a control signal received from said control logic and a frame address corresponding to a sensed HDLC frame present at said front end logic means and transmitted therefrom, an address corresponding to both said frame address and an address location in said RAM, with said address location having information stored therein indicative of a status of said poll frame, wherein said control logic means interprets said status and passes said poll frame to said HDLC controller if an information frame is queued for that address, otherwise said poll frame is passed to said front end logic means and output via said output port.

2. The apparatus of claim 1, wherein said control logic means is operable to receive a bus acknowledge signal from said microprocessor to thereby enable said address generator means.

3. The apparatus of claim 1, wherein said control logic means is operable to interpret said status of said poll frame to discard an incoming frame having an inactive address.

4. The apparatus of claim 1, wherein said hardware engine is implemented utilizing field programmable gate arrays.

5. The apparatus of claim 1, wherein a list of valid addresses is fixed as a hard-wired function in said front end logic means.

6. The apparatus of claim 1, further including an address latch and data transceiver both coupled between said microprocessor and said RAM.

7. The apparatus of claim 1, wherein said RAM is a single port RAM chip.

8. An interface for a high level data link control (HDLC) protocol to enable sharing of single port random access memory (RAM) with a microprocessor, said interface including:

HDLC engine means for receiving and analyzing an HDLC frame, said engine means being operable to generate a bus request signal to said microprocessor upon receipt of a predetermined type frame, thereby allowing access to an address status table stored in said RAM, wherein status data stored in said RAM is passed back to said engine means for analysis and response;

control logic means, coupled to said RAM, for transmitting said bus request signal to said microprocessor; and a logic module coupled between said microprocessor and said RAM, said logic module being operable to enable the control logic to retrieve data corresponding to a predefined address in the RAM upon receipt of a hold acknowledge signal from said microprocessor.

9. The interface of claim 8, wherein said HDLC engine is implemented utilizing field programmable gate arrays.

10. The interface of claim 7, wherein a list of valid addresses is fixed as a hard-wired function of said HDLC engine.

11. An interface for a high level data link control (HDLC) protocol to enable sharing of single port random access memory (RAM) with a microprocessor, said interface comprising:

front end logic means, including an input port and output port, for receiving a plurality of HDLC frames and verifying various data present in each of said plurality of frames, said data corresponding to predefined addresses and one of a plurality of frame types, with said front end logic means discarding HDLC frames having addresses differing from said predefined addresses;

control logic means, coupled to both said front end logic and said RAM, for transmitting a bus request signal to said microprocessor upon sensing notification from said front end logic means of receipt of a first-type of frame and transmitting second-type frames directly to said HDLC controller;

a logic module coupled between said microprocessor and said RAM, with the logic module being operable to enable the control logic to retrieve data corresponding to a predefined address in the RAM, upon receipt of a hold acknowledge signal from said microprocessor; and address generator means, coupled to said RAM, said control logic means and said front end logic means, for generating, in response to both a control signal received from said control logic and a frame address corresponding to a sensed HDLC frame present at said front end logic means and transmitted therefrom, an address corresponding to both said frame address and an address location in said RAM, with said address location having stored therein information concerning a status of said frame, wherein said control logic means interprets said status of said first-type frame and passes said first-type frame to said HDLC controller if said first-type frame is queued for that address, otherwise said first-type frame is passed to said front end logic means and output via said output port.

12. The interface of claim 11, wherein said control logic means is operable to receive a bus acknowledge signal from said microprocessor to thereby enable said address generator means.

13. The interface of claim 11 wherein said first-type frame is a frame having polling information, defining a poll frame and said second-type frame is a frame not including polling information, defining a non-poll frame.

14. The interface of claim 13, wherein said control logic means is operable to interpret said status of said poll frame to discard an incoming frame with an inactive address.

15. A method of implementing a shared random access memory (RAM) interface between a high level data link control (HDLC) engine and a microprocessor, said method including the steps of:

receiving an HDLC frame at said HDLC engine;

verifying whether said HDLC frame includes predefined parameters, said parameters including a valid address, with an HDLC frame having a valid address defining a valid HDLC frame;

sensing a frame-type of said valid HDLC frame to determine whether said valid HDLC frame contains polling instructions, defining a poll frame;

issuing a bus request signal to hold operations of said microprocessor in response to sensing said poll frame;

accessing a status table in said RAM to obtain data corresponding to said poll frame; and responding to said data on an outgoing link of said HDLC engine.

* * * * *